June 26, 1962   I. F. WEEKS   3,041,134
METHOD OF REMOVING GASEOUS FISSION PRODUCTS FROM GASES
Filed Dec. 12, 1955
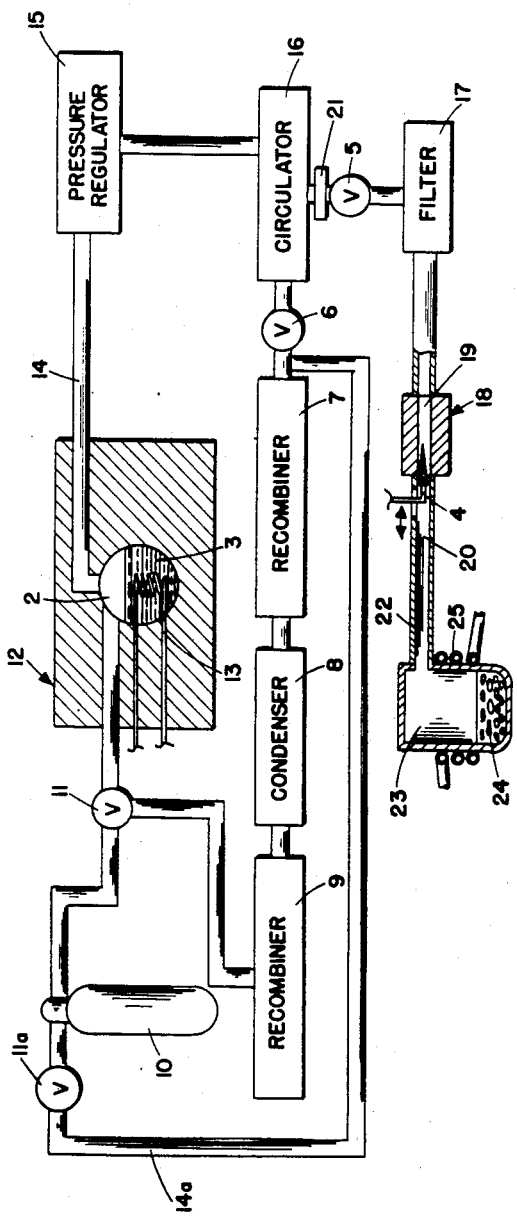
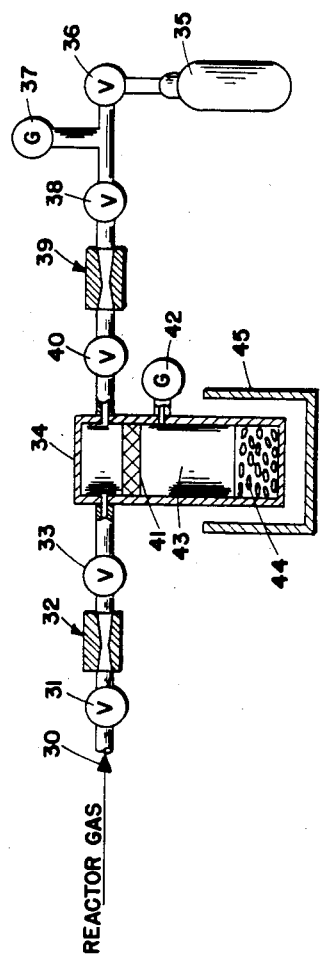
INVENTOR.
IVAN F. WEEKS
BY
William R. Lane
ATTORNEY

United States Patent Office 3,041,134
Patented June 26, 1962

3,041,134
METHOD OF REMOVING GASEOUS FISSION PRODUCTS FROM GASES
Ivan F. Weeks, Danville, Calif., assignor to North American Aviation, Inc.
Filed Dec. 12, 1955, Ser. No. 552,394
7 Claims. (Cl. 23—2)

The present invention is concerned with a method and apparatus for removing fission gases of high radioactivity from a gas circulating through a nuclear reactor. More particularly, the invention is directed to an apparatus and a method for intermittently removing radioactive gases from circulating fission gas mixtures and decreasing the volume of such mixtures.

A distinct problem in the closed-cycle operation of a nuclear reactor is the removal of the radioactive fission products from the circulating gas mixture. Heretofore, the radioactive fission products containing amounts of xenon and krypton have been allowed to be built up in the gas handling system until a point was reached where such gases, along with the oxygen, would be pumped into a disposable vessel. Alternatively, the gases would be continually or intermittently vented through a delay trap and high stack. Xenon and krypton have a comparatively long half-life, and generally require such a delay system prior to release to the atmosphere. Such methods are not favored due to the large volume needed in the vessel or to the inherent dangers of releasing radioactivity into the atmosphere. The present invention provides a method of continually or preferably intermittently reacting the oxygen gas in the fission gas mixture with a chemical to form a solid or liquid, thus greatly cutting down the volume needed to dispose of the total fission gas products. The invention achieves this result by controlling the rate of reaction of the oxygen and the reacting chemical by providing for a sonic flow (at least 1,000 feet/second) of the oxygen and fission gases through a nozzle or orifice into a reaction chamber. Except for small temperature effects, the area of the nozzle or orifice controls the reaction in the vessel by limiting the rate of flow of gaseous reactant to the reaction chamber where nominally violent chemical reactions take place. Choked flow is herein defined as the physical hydrodynamic condition existing when the mass-velocity through a duct is equal at some point to the velocity of sound at the local thermodynamic temperature. The oxygen is chemically removed from the gas mixture thereby separating the krypton and xenon from the oxygen. Other non-noble gases such as nitrogen and hydrogen can also be removed chemically. While oxygen and/or hydrogen have been removed from various gaseous mixtures by catalytically combining them to form water or other products, none of these prior processes, however, have controlled the rate of reaction of the products as herein described.

The formation of permanent gases in a water boiler type nuclear reactor can be attributed to essentially three sources; namely, the instability of water under irradiation, the instability of the container to the solutions contained therein, and the thermal and irradiation instability of the solvates and solutions used in the reactor. Water boiler reactors are generally operated on solutions of uranyl nitrate or uranyl sulfate enriched in uranium-235 isotope. In such water boiler reactors, either of the open cycle or closed-cycle types, oxygen acts as a carrier for the fission gases produced by any of the above sources. Normally the gases formed during enriched uranyl sulfate solution operation are hydrogen and oxygen, while the gases from enriched uranyl nitrate solutions are hydrogen, oxygen and nitrogen. The carrier gas for the latter may contain from zero to twenty percent nitrogen along with the oxygen.

An object of this invention is to provide a method of isolating radioactive fission gases from a fission gas mixture containing oxygen.

A further object of this invention is to provide an apparatus for isolating radioactive fission gases and oxygen.

A still further object of this invention is to provide a method and means for removing radioactive fission gases from a chemically active gas mixture.

An additional object of this invention is to provide an oxygen circulating and radioactive fission gas decontamination system for a water boiler type nuclear reactor.

A further object of this invention is to provide a method of decontaminating gases within a closed-cycle water boiler reactor.

A still further object of this invention is to provide an apparatus for disposing of fission gases circulating within a nuclear reactor.

An additional object of this invention is to provide a method of chemically combining the oxygen gas in a fission gas mixture with various chemically active substances.

A further object of this invention is to provide a means for controlling the rate of reaction of oxygen and various active chemicals.

An additional object of this invention is to provide a method of controlling the rate of reaction of oxygen and various active chemicals.

A further object of this invention is to provide a method and apparatus for decreasing the volume of fission gas products necessary to be removed from a circulating gas system within a nuclear reactor.

Other objects of invention will become apparent from the following description taken in connection with the accompanying drawings, in which FIG. 1 represents the over-all gas handling system for a closed-cycle, water boiler type nuclear reactor incorporating the present invention;

And FIG. 2 shows a modification of the oxygen removal gas handling system.

FIG. 1 herein shows a water boiler reactor 12 having a core assembly 2, which normally comprises a stainless steel shell containing a uranyl nitrate and/or uranyl sulfate solution 3 enriched in uranium-235 isotope. A cooling means 13 is provided in the core having water or an organic cooling material flowing therein. The mechanism for the recirculation and cooling of such coolant is conventional and is omitted from the drawing. In normal operation of the water boiler reactor 12, fission gases are produced within the core 2 which are conducted along conduit 14, through pressure regulator 15, and are circulated through pump or circulator 16. When valve 6 is in the open position, the fission gases containing hydrogen, nitrogen, oxygen, xenon and krypton are passed through an oxygen recombiner 7 of the catalytic type to react the hydrogen and part of the oxygen to form water vapor. This vapor and the remaining gases, including oxygen, nitrogen, xenon and krypton, are passed into the condenser 8 to condense the water vapor and then are conducted into a nitrogen recombiner 9, generally of the glow discharge type, to combine the nitrogen, oxygen, water and remaining hydrogen into nitric acid, which is returned to the core 2 of the reactor through valve 11. The use of these various recombiners form no part of the present invention. Oxygen from source 10 is supplied to the closed cycle at the start of the operation to act as the aforesaid fission gas carrier. Valve 11a and conduit 14a are used for passing pure oxygen gas through the recombiner when necessary. The gas disposal system of the present invention is brought into operation when the radioactivity of the xenon and krypton in the circulating fission gases reaches a predetermined value as measured conveniently by gamma intensity. The xenon and krypton will generally be present in the amounts of 1 to 5 parts per million. Prior to the actual disposal operation, the reactor gas is circulated through the recombiner to reduce the hydrogen concentration to a few parts per million. During disposal of the radioactive fission gases, valve 6 is closed and the gases are circulated through valve 5, filtered by filter 17 (e.g., silica gel or graphite) to remove solid materials, and are accelerated in velocity by passing or flowing the gases through a conduit means 18 including a choked flow orifice means 4. A cold trap 21 may also be provided between circulator 16 and valve 5 to remove water vapor. Means 4, which may typically take the form of hypodermic needle stock or orifice varying wedge means, controls the amount of gas flow through the sonic section due to the hereinafter described pressure and velocity relationships in inlet and exit portions 19 and 20. The use of stainless steel hypodermic stock is preferred since it can be crimped off and dipped in silver solder, thereby making a leak-proof seal when disconnecting the disposal system. The fission gases under the control of the means 4 then pass through flow line 22 into a reaction vessel or chamber 23. A solid reactant 24, generally in powdered form taken from the group consisting of phosphorous, lithium, calcium and magnesium, is positioned within the reaction vessel 23 so that the oxygen carrier in said fission gases will react with the solid reactants to form oxides of such reactants. As explained hereafter with respect to FIG. 2, the oxygen may also be reacted with hydrogen to form $H_2O$. Also as explained with respect to FIGURE 2, the reaction vessel 23 may be removed for disposal. The disconnection is made by means of a removable plug valve in line 20 (not shown). Cooling means 25 is provided in FIG. 1 to remove the heat of reaction. Placing the cold trap ahead of valve 5 eliminates the low temperature cooling problem. Water or hydrocarbon may typically be circulated through means 25. The removal of the heat of reaction by natural or forced conduction through vessel 23 provides a safe means of preventing the over heating of the reaction chamber and minimizing the temperature expansion of xenon and krypton gases trapped in said vessel. The prevention of a violent heat release is through the choked flow principle, e.g., a cooling tube in a "thermite bomb" is useless. The above operations are preferable, carried on while the reactor is shut down but such shut down is not essential. However, a small condensor-recombiner assembly would have to be inserted between the cold trap and the circulator so as to avoid the accumulation of hydrogen in the reaction chamber and eventually stopping the aspiration effect of the chamber due to formation of a solid substance.

The condition for sonic flow is given by the equation:

$$\frac{P_1}{P_2}=\left(1+\frac{\gamma-1}{2}\right)^{\frac{\gamma}{\gamma-1}}=1.9$$

where $\gamma$ is ratio of the specific heats of the gas at constant pressure and at constant volume; $P_1$ is the reactor pressure; and $P_2$ is the low pressure side of the flow system. For example, when the reactor atmosphere is maintained at approximately one atmosphere, approximately one-half atmosphere must be maintained on the low pressure side of the flow control section. This pressure is maintained and controlled at less than one-half atmosphere by chemical condensation due to the reaction of the oxygen with one of the reactants mentioned above. Phosphorus, for example, reacts with oxygen as follows:

$$4P+5O_2 \rightarrow 2P_2O_5$$

effecting a volume reduction of the order of $10^3$ and hence at constant temperature a pressure reduction of $10^{-3}$ p.s.i. The heat of formation $P_2O_5$ is $-371.7$ kcal. $mole^{-1}$, i.e., 148 kcal./mole $O_2$ reactant. When about 20 moles of oxygen are used in the flushing operation (about four times the normal volume of the reactor gas system) in a typical water boiler reactor, the total heat released is of the order of 11,800 B.t.u. On the basis of a four-hour scrubbing operation, the heat release of 3,950 B.t.u./hr. must be compensated for by heat transfer. When lithium, calcium or magnesium is used as the reactant material in place of phosphorous or hydrogen, removal of any nitrogen present in the fission gas mixture will also be effected in the reaction vessel 23. To insure very fast chemical reaction, the calcium and magnesium would have to be heated.

A typical calculation for the determination of the necessary size orifice for obtaining choke flow is given below. The mass of flow associated with a given cross-section area is $$m=\rho v A$$

where $\rho$ is the density in $\#/ft.^3$; $v$ is velocity in ft./sec.; and $A$ is orifice area in $ft.^2$. Since the pressure in the reactor gas handling system is controlled and the $v$ is the velocity of sound in choked flow, the mass of oxidant entering the reactor chamber, neglecting small temperature effects, is then specified by $A$. Further, since the chemical reactions occur upon contact of the reactor gas with the substances in the reaction chamber, the rate of heat release is likewise controlled by the $A$.

The velocity of sound is given as $$c=\sqrt{\gamma RT}$$

where $\gamma$ is the ratio of specific heats (1.4 for oxygen); and R is the gas constant.

At Mach 1 the ratio $v/c$ is unity. Hence, for "choked flow"

$$m=\rho\sqrt{RTA}=46.6\rho A\sqrt{T}$$

Assuming that a closed-cycle water boiler gas handling system has approximately 20 liters of almost pure oxygen therein under standard conditions of temperature and pressure, the reactor gas atmosphere is equivalent to about a mole of oxygen, i.e., 22.4 liters. The volume of gas in $ft.^3$ equivalent to 22.4 liters is $22.4 \times 0.0353 = 0.79$ $ft.^3$.

If it is considered that 20 volume changes are adequate for decontamination, then $\sim 16$ $ft.^3$ of flush oxygen is required. On the basis of the above flow and a flushing time of 4 hours, the flushing rate per second is $$\frac{16}{4\times 3600}=1.11\times 10^{-3} \ ft.^3/sec.$$

or on the basis of $\rho=0.89$ $\#/ft.^3$ $$1.11\times 10^{-3}\times 8.9\times 10^{-2}=0.99\times 10^{-4} \ \#/sec.$$

The area of the orifice at 530° R is

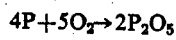

$$=\frac{0.99\times 10^{-4}}{4.64\times 10^1 \times .89 \times 10^{-1} \times 2.3 \times 10^1}=1.03\times 10^{-6}$$

The equivalent diameter is given as $$D^2=4\times A/\pi=1.31\times 10^{-6}$$

The diameter of the orifice will then be $$D=1.14\times 10^{-3} \ ft.=1.38\times 10^{-2} \ inches$$

From these calculations it can be seen that hypodermic needle stock may be used to control a "choked"-flow-type of flushing operation.

The use of sonic flow may also be used to control the reaction rate for the disposal of reactor gas containing only oxygen and fission gases by burning the oxygen with hydrogen. FIG. 2 shows apparatus for reacting the oxygen in the reactor gas with a source of hydrogen. Reactor gas corresponding to the gas coming through circulator 16 in FIG. 1 is passed through a reactor gas inlet 30, a valve 31, and a sonic flow section 32 as described with respect to FIG. 1. Simultaneously, with the flow of reactor gas through sonic section 32, entrance of hydrogen from hydrogen source 35 by way of valves 36 and 38 and sonic section 39 is effected into a reaction vessel or chamber 34. Removable plug valves 33 and 40 are provided between the reaction vessel and each of the sonic sections 32 and 39 such that the reaction vessel 34 may be removed for disposal. Reactor gases, containing oxygen, are passed through valve 33 into the reaction chamber 34 as hydrogen is passed through valve 40 into such reaction chamber. The gases mix and are passed over a catalytic screen normally made of platinum which is instrumental in reacting the hydrogen and oxygen to form water vapor. Suitable pressure gauges 37 and 42 are provided in the hydrogen source flow line and in the reaction vessel, respectively, to control the pressures on either side of the sonic section 39. The sonic sections are designed so as to inject a stoichiometric mixture into the catalyst bed 41. The pumping power controlling the rate of reaction is indirectly supplied by the pressure differential created by a refrigerant within container 45, which condenses the water vapor in volume 43 into a liquid or solid 44. The pressure in the reaction vessel 34 is monitored either automatically or manually by varying the pressure in the hydrogen sonic section. When the reactor has been flushed sufficiently, plug in valves 33 and 40 are closed along with valves 31 and 36 and the reaction vessel 34 disconnected at such plug valves for disposal. The free volume of the reaction vessel is such that only a few atmospheres build-up is present at temperatures of the order of 100° F.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of confining gaseous fission products contained in admixture with added oxygen carrier gas, said mixture having a given volume at ambient temperature and pressure, in a vessel having a smaller volume than said given volume at said temperature and pressure, comprising admitting a mixture of said added oxygen carrier gas and said gaseous fission products to a reaction vessel containing a reactant selected from the group consisting of phosphorus, lithium, calcium, magnesium, and added hydrogen, forming an oxide of said reactant, thereby removing said added oxygen carrier gas from said mixture and reducing the volume of said gas, and retaining said fission gases within said vessel.

2. A method of removing gaseous fission products from a system comprising admitting oxygen to said gaseous fission-products-containing system thereby forming a gaseous mixture of added oxygen carrier gas and gaseous fission products, admitting said mixture to a reaction vessel containing a reactant selected from the group consisting of phosphorus, lithium, calcium, magnesium, and added hydrogen, permitting the oxygen to react with said reactant forming an oxide thereof, thereby removing said oxygen from said mixture and reducing the volume of said gas, and retaining said fission gases within said vessel.

3. The process of claim 2 wherein said gaseous mixture is admitted to said reaction vessel at a predetermined rate.

4. A method of removing gaseous fission products from a system comprising admitting oxygen into said gaseous fission-products-containing system thereby forming a gaseous mixture of added oxygen carried gas and gaseous fission products, admitting said mixture at a predetermined rate at a sonic speed of flow to a reaction vessel containing a reactant selected from the group consisting of phosphorus, lithium, calcium, magnesium, and added hydrogen, permitting the oxygen to react with said reactant forming an oxide thereof, thereby removing said oxygen from said mixture and reducing the volume of said gas, and retaining said fission gases within said vessel.

5. A method of removing gaseous fission products from a system comprising admitting oxygen carrier gas to a gaseous-fission-product-containing system thereby forming a gaseous mixture of added oxygen carrier gas and gaseous fission products, admitting said mixture to a reaction vessel containing a hydrogen and oxygen recombining catalyst at a predetermined rate, concurrently admitting hydrogen to said vessel at a rate sufficient to provide a stoichiometric amount of hydrogen based on the amount of oxygen admitted to said vessel for the formation of water, permitting said oxygen and said hydrogen to contact said recombining catalyst and react to form water, condensing said water and retaining said fission gases within said vessel.

6. The method of claim 5 wherein each of said oxygen and said hydrogen is admitted to said reaction vessel at sonic speed.

7. A method of removing gaseous fission products from a system comprising admitting oxygen carrier gas into said gaseous fission products-containing system thereby forming a gaseous mixture of added oxygen carrier gas and gaseous fission products, admitting said mixture at a predetermined rate at a sonic speed of flow to a reaction vessel containing phosphorus, permitting said oxygen to react with said phosphorus forming a phosphorus oxide, thereby removing said oxygen from said mixture and reducing the volume of said gas, and retaining said fission gases within said vessel.

References Cited in the file of this patent

UNITED STATES PATENTS

| | | |
|---|---|---|
| 1,955,328 | Frey | Apr. 17, 1934 |
| 2,204,501 | Krauss | June 11, 1940 |
| 2,582,885 | Rosenblatt | Jan. 15, 1952 |
| 2,767,233 | Mullen et al. | Oct. 16, 1956 |

OTHER REFERENCES

Bunker et al.: "Gas Recombination System of the Los Alamos Homogenous Reactor," LA 1337, written December 1951. Issued March 6, 1952.

King: "Proceedings of the International Conference on the Peaceful Uses of Atomic Energy," vol. 2, pages 372–391. Held in Geneva Aug. 8–20, 1955. United Nations Publication 1956.

Martin: A.P.C. Publication 353,130, Apr. 27, 1943.